(No Model.)
G. W. WEYMAN.
JAR FASTENING.
No. 326,818.      Patented Sept. 22, 1885.
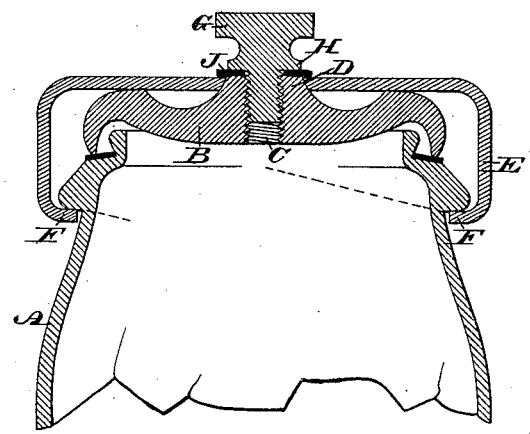
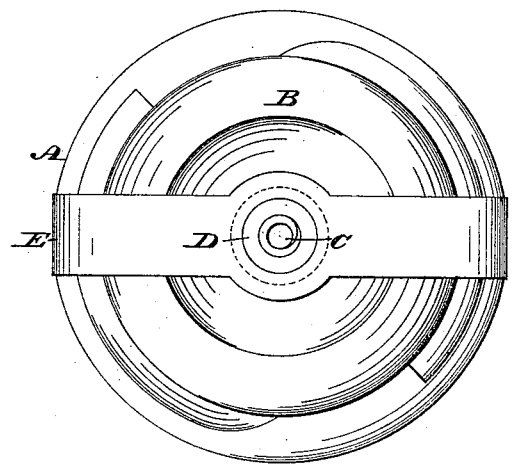
WITNESSES:
INVENTOR:
BY
ATTORNEY.

United States Patent Office.

GEORGE W. WEYMAN, OF CLAYTON, NEW JERSEY, ASSIGNOR OF ONE-HALF TO CHARLES T. WEYMAN, OF PHILADELPHIA, PENNSYLVANIA.

JAR-FASTENING.

SPECIFICATION forming part of Letters Patent No. 326,818, dated September 22, 1885.

Application filed June 3, 1885. (No model.)

*To all whom it may concern:*

Be it known that I, GEORGE W. WEYMAN, a citizen of the United States, residing at Clayton, in the county of Gloucester, State of New Jersey, have invented a new and useful Improvement in Preserve-Jar Fastenings, which improvement is fully set forth in the following specification and accompanying drawings, in which—

Figure 1 represents a vertical section of a preserve-jar fastening, embodying my invention. Fig. 2 represents a top view of a portion thereof.

Similar letters of reference indicate corresponding parts in the two figures.

My invention consists of a preserve-jar having a vent in the lid thereof for the admission of air, and a fastening composed of a clamp journaled on the exterior of a boss rising from the wall of said vent, and a screw which is fitted to the interior of said boss, and serves to close the vent and by aid of a gasket interposed between the head of the screw and the boss hold the clamp in position.

Referring to the drawings, A represents a fruit or preserve jar, and B the lid thereof, formed of glass, the latter having a central opening or vent, C, for admission of air to the jar when it is desired to open the same. The wall of the vent is extended upwardly, forming a boss, D, on the exterior of which is journaled a rotating clamp, E, which consists of a bar, strip, or piece of metal bent on its ends, and having on the terminations thereof inwardly-projecting lips F, which are adapted to engage with spiral lugs or threads on the jar A, it being noticed that the clamp E has a central opening, and the exterior surface of the boss D is plain, so that the clamp may rotate on said boss.

G represents a screw, which is fitted to the inner threaded wall of the boss D and vent C, and has a shoulder, H, with rubber or other packing, J, placed thereagainst, so disposed that when the screw is tightened in position it bears against the boss D and clamp E. When the lid is placed on the jar, the clamp is rotated, its ends or lips engaging with the spiral lugs, thus clamping the lid to the jar. The screw is tightened, closing the vent. The packing between the shoulder of the screw and lid prevents the screw from chipping, cracking, or otherwise fracturing the boss, and when the clamp is rotated to open the jar it cannot be removed over the screw, owing to the packing overhanging the wall of the central opening of the clamp. Consequently, when the lid is removed, the clamp and screw remain therewith, separation and loss of parts thus being prevented. When the lid is on the jar, and the clamp is unscrewed in order to open the jar, should the lid stick on its seat the screw is rotated or removed so that air is permitted to enter the jar through the vent. Then the screw may be restored or tightened in the lid, so that the clamp remains attached to the lid, owing to the packing interposed between the said clamp and the screw, as hereinbefore set forth.

Having thus described my invention, what I claim as new, and desire to secure by Letters Patent, is—

1. A jar having spiral lugs on the exterior thereof, in combination with a lid having a threaded bent opening, a clamp having lips engaging with said spiral lugs, and a screw arranged to work in said threaded opening and with a gasket or packing adapted to retain the said clamp on said lid, substantially as and for the purpose set forth.

2. The jar A, having spiral lugs, in combination with the lid B, having threaded opening C in the center thereof, the clamp E, journaled on a boss of said lid, and having lips F, and screw G, having shoulder H, substantially as and for the purpose set forth.

3. A jar having spiral lugs and a clamp having lips on its end and an opening in its center, in combination with a lid having a boss having an internally-threaded vent-opening, and a screw engaging with said vent-opening, and having its shoulder or head above the wall of the central opening of the clamp, substantially as and for the purpose set forth.

GEORGE W. WEYMAN.

Witnesses:
JOHN A. WIEDERSHEIM,
A. P. GRANT.